3,129,959
HOSE COUPLING
John J. Kuzma, 49 Beach St., North Haven, Conn.
Filed Aug. 1, 1961, Ser. No. 128,510
2 Claims. (Cl. 285—74)

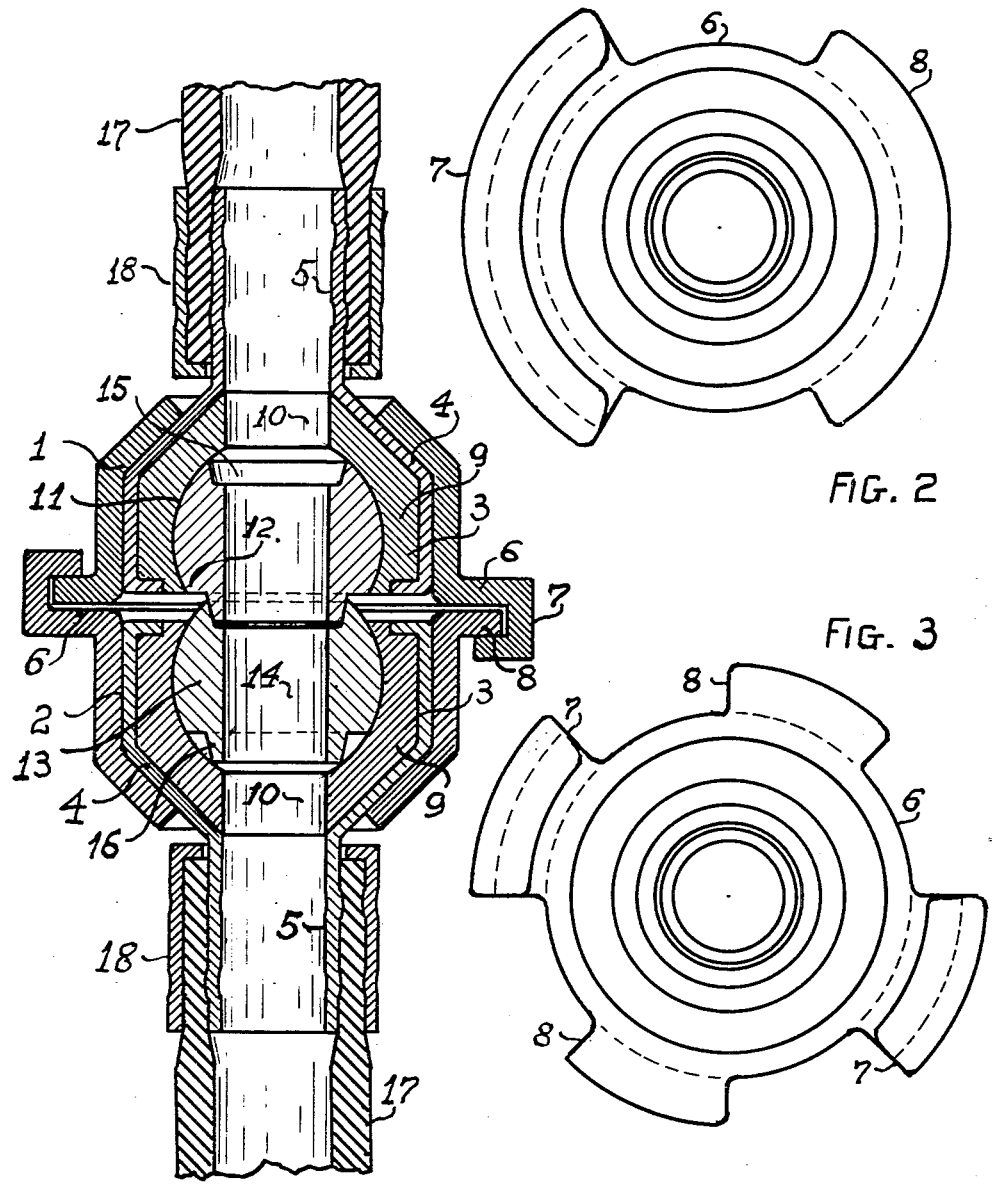

My invention relates to hose couplings and more particularly to detachable hose couplings having identical mating elements.

The detachable hose couplings customarily used for the transmission of fluids under pressure have conical or spherical mating surfaces for greater tightness, forming a convex mating element in one part of the coupling and a corresponding concave mating element in the other part of the connected coupling. This difference of the mating elements represents considerable inconvenience in the use of these detachable hose couplings.

The principal object of my invention is to provide a detachable hose coupling in which the mating elements are perfectly identical in shape and dimensions, thereby offering a greater freedom and convenience in the joining of the hose terminals.

Another important object of my invention is to provide a detachable hose coupling in which the identical mating elements have conical mating surfaces for maximum sealing effect, offering thereby a very advantageous feature hitherto available only in hose couplings having nonidentical mating elements.

Another important object of my invention is to provide a hose coupling which, due to its self sealing characteristic, is particularly applicable for the transfer of high pressure and high temperature fluids.

A further object of my invention is to provide a hose coupling which can be manufactured very economically by mass production methods and with minimum machining. Further objects and advantages of my invention will be apparent during the course of the following description.

In the accompanying drawing, forming a part of this application, wherein for the purpose of illustration are shown a preferred and a modified form of my invention, FIGURE 1 is a longitudinal sectional view of the preferred form of my hose coupling, FIGURE 2 is a plan view of the frontal end of one of the mating parts illustrated in FIGURE 1, FIGURE 3 is a plan view of the frontal end of a modified form of the mating part.

Referring to the drawing, the numerals 1 and 2 designate the two mating parts of my hose coupling (see FIG. 1), which are totally identical in their construction and dimensions. Each of these parts 1 and 2 comprises a body portion 3 which, in the preferred form illustrated in FIG. 1, is composed of a shell 4, having a tubular extension or shank 5. The function of this shank 5 is to provide a means for the connection of the hose 17 to the coupling, which in this case is accomplished by the clamp 18.

Each body portion 3 is provided at its frontal end with a flange 6, having hooked and straight sections represented by the numerals 7 and 8, respectively, which are so formed that, when the two mating parts 1 and 2 of the coupling are joined, the hooked section 7 of one of the mating parts will interlock with the straight section 8 of the other mating part, and vice versa, so as to form a bayonet-type lock. In the form illustrated in FIGS. 1 and 2 the flange 6 has only one pair of these interlocking sections 7 and 8, in the alternative form shown in FIG. 3 there are two pairs of these interlocking sections.

In other alternative forms the flanges 6 of the mating parts of my hose coupling may be secured together by bolts or other suitable means known in the art, provided only that construction of the two mating parts of the coupling remains perfectly identical.

Mounted within the shell 4 and forming a part of the body portion 3 is the socket 9, which has at its frontal end a spherical cavity 11, having smooth wall and a frontal circular end opening 12 of smaller diameter than the maximum diameter of the cavity 11. The socket 9 is provided with an axial passage 10 leading from the cavity 11 to the tubular shank 5 and to the interior of the hose 17.

Rotatably mounted within the cavity 11 is a globular mating element 13, which is an essential feature of the present invention. This element 13 has a hermetically sealing spherical surface adjacent to, and in contact with, the smooth wall of the cavity 11, preventing the passage of the fluid between the adjacent surfaces of the element 13 and the cavity 11 and, at the same time, permitting the rotation of the element 13 within the cavity 11. This element 13 is provided with a central passage 14, terminating at one end with a concave conical mating surface 15 and a convex conical mating surface 16 at the other end. These mating surfaces have perfectly corresponding dimensions, so that the convex conical mating surface 16 of an element 13 will hermetically fit into the concave conical mating surface 15 of another element, and vice versa.

In the preferred form of my hose coupling this globular mating element 13 consists of machined metal or plastic material and the socket 9 is molded into the shell 4 with the globular element 13, covered with a suitable release agent, being held in position.

In alternative forms of my hose coupling the socket 9 may be integral with body portion 3 and may have a machined spherical cavity 11, into which the globular mating element 13 may be molded. The use of plastic materials, in mating element 13 and in the socket 9, which have higher coefficient of thermal expansion than the exterior part of the body portion 3 will result in tightening of the contact surfaces when transferring higher temperature fluids, thereby giving a self-sealing characteristic to my hose coupling.

In operation my coupling will give perfect mating when the globular mating elements 13 are so positioned that the concave conical mating surface 15 is exposed in one of the mating parts and the convex conical mating surface 16 is exposed in the other mating part of the coupling. By the rotation of the globular mating elements 13 this condition can be always easily and conveniently obtained.

It is to be understood that the forms of my invention herein described and illustrated are only examples of the same, and that various modifications in the shape, size, and in the arrangement of parts may be resorted to, without departing from the spirit of my invention or from the scope of the subjoined claims.

I claim:

1. A detachable self sealing hose coupling composed of two identical mating parts, each comprising a shell; a tubular shank secured to one end of said shell for the connection of the hose; a flange secured to the opposite end of said shell and having opposing interlocking sections forming a bayonet type lock when joined to the flange of the other mating part of the coupling; a socket mounted within said shell and having a smooth surfaced spherical cavity, communicating with the said tubular shank by means of an axial passage, opposite to this passage said cavity has a circular open end the diameter of which is smaller than the maximum diameter of said cavity; a globular mating element mounted within said cavity and having a hermetically sealing spherical surface adjacent to the wall of the said cavity, permitting the rotation of said element within said cavity, said mating element has a central passage, with a concave conical mating surface at one end of said central passage and a corresponding convex conical mating surface at the other end of said central passage, so arranged that, when said rotatable mating element is positioned so as to expose one of these mating surfaces, it will mate the opposite mating surface of the other mating part of the coupling.

2. A detachable self sealing hose coupling composed of two identical mating parts, each comprising a body portion, having at its frontal end interlocking flange forming a bayonet type lock with the flange of the other mating part, and a tubular shank for the connection of the hose, said body portion has a spherical cavity, communicating with the said tubular shank, said cavity has a smooth surface and a circular end opening adjacent to the frontal end of said body portion, the diameter of the said end opening being smaller than the maximum diameter of said cavity; a globular mating element rotatably mounted within said cavity and having a hermetically sealing spherical surface adjacent to the wall of the said cavity, said mating element has a central passage and a concave conical mating surface at one end of said passage and a corresponding convex conical mating surface at the other end of said passage, each of these mating surfaces may be selectively positioned, by the rotation of the said globular mating element, so as to mate the oppositely positioned mating surface of the other mating part of the hose coupling, thereby providing passage through the coupling.

References Cited in the file of this patent

UNITED STATES PATENTS

| | | |
|---|---|---|
| 525,854 | Martin | Sept. 11, 1894 |
| 758,627 | Downing | May 3, 1904 |
| 846,994 | Gold | Mar. 12, 1907 |
| 894,900 | Pohlman | Aug. 4, 1908 |
| 974,975 | Kelley | Nov. 8, 1910 |
| 1,930,833 | Barrett | Oct. 17, 1933 |
| 2,732,231 | Zobel | Jan. 24, 1956 |

FOREIGN PATENTS

| | | |
|---|---|---|
| 3,861 | Sweden | July 9, 1891 |
| 432,133 | France | Dec. 29, 1911 |